(12) United States Patent
Ranjan et al.

(10) Patent No.: US 9,792,702 B2
(45) Date of Patent: Oct. 17, 2017

(54) ENHANCED PRECISION BACKGROUND SHADING FOR DIGITALLY PUBLISHED TEXT

(71) Applicant: Adobe Systems Incorporated, San Jose, CA (US)

(72) Inventors: Vivek Ranjan, Muzaffarpur (IN); Sanyam Jain, New Delhi (IN); Sameer Manuja, Ghaziabad (IN); Reena Agrawal, Delhi (IN); Mohammad Javed Ali, Delhi (IN); Makiko Shimoda, Chiba (JP); Dinesh Kukreja, Gurgaon (IN); Anil Ahuja, Noida (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 116 days.

(21) Appl. No.: 14/942,056

(22) Filed: Nov. 16, 2015

(65) Prior Publication Data

US 2017/0140554 A1  May 18, 2017

(51) Int. Cl.
*G06T 11/00* (2006.01)
*G06F 17/21* (2006.01)

(52) U.S. Cl.
CPC .......... *G06T 11/001* (2013.01); *G06F 17/212* (2013.01)

(58) Field of Classification Search
CPC ....... G06T 11/001; G06T 15/60; G06T 15/80; G06T 2215/12; H04N 21/4312; H04N 2201/3245
See application file for complete search history.

(56) References Cited

U.S. PATENT DOCUMENTS

| 7,071,941 | B2 | 7/2006 | McCully |
| 7,123,261 | B2 | 10/2006 | McCully |
| 7,296,227 | B2 | 11/2007 | McCully |
| 7,305,617 | B2 | 12/2007 | McCully |
| 7,320,104 | B2 | 1/2008 | Lynn et al. |
| 7,602,402 | B2 * | 10/2009 | Chuang ................. G06T 11/001 345/549 |
| 8,988,434 | B1 * | 3/2015 | Roth ..................... G06T 11/001 345/467 |
| 2011/0074807 | A1 * | 3/2011 | Inada .................... G06T 11/001 345/589 |

(Continued)

OTHER PUBLICATIONS

"Working with Type in Adobe InDesign CC" Olav Martin Kvern et al. Peachpit. Aug. 2, 2013. Accessed via the web @ http://www.peachpit.com/articles/article.aspx?p=2114360&seqNum=6 on Jun. 7, 2017.*

(Continued)

*Primary Examiner* — Antonio A Caschera
(74) *Attorney, Agent, or Firm* — Finch & Maloney PLLC

(57) ABSTRACT

Various techniques more precisely and reliably (a) position top and bottom boundaries of a region of background shading, (b) position left and right boundaries of a region of background shading, (c) define a region of background shading that is applied to Chinese, Japanese, or Korean characters, and (d) apply a clipping path to achieve an arbitrarily-shaped region of background shading. These techniques allow background shading to be applied to textual content precisely and reliably, and also reduce the likelihood that unwanted visual artifacts are introduced into a digital publication.

10 Claims, 12 Drawing Sheets

(56) References Cited

U.S. PATENT DOCUMENTS

2012/0249595 A1* 10/2012 Feinstein .............. G06F 1/1694
                                                           345/642
2014/0157105 A1    6/2014 Plesnicher

OTHER PUBLICATIONS

"A Guide to QuarkXPress: Using QuarkXPress"—Quark Technology Partnership (c) 2002. Accessed via the web @ http://www.planetquark.com/images/library/5/QXP5_UserGuide.pdf on Jun. 7, 2017.*

Fritz, James, "Highlighting an Entire Paragraph with Color" Mar. 17, 2009), retreived from <http://indesignsecrets.com/highlighting-an-entire-paragraph-with-color.php> on Aug. 7, 2015.

* cited by examiner

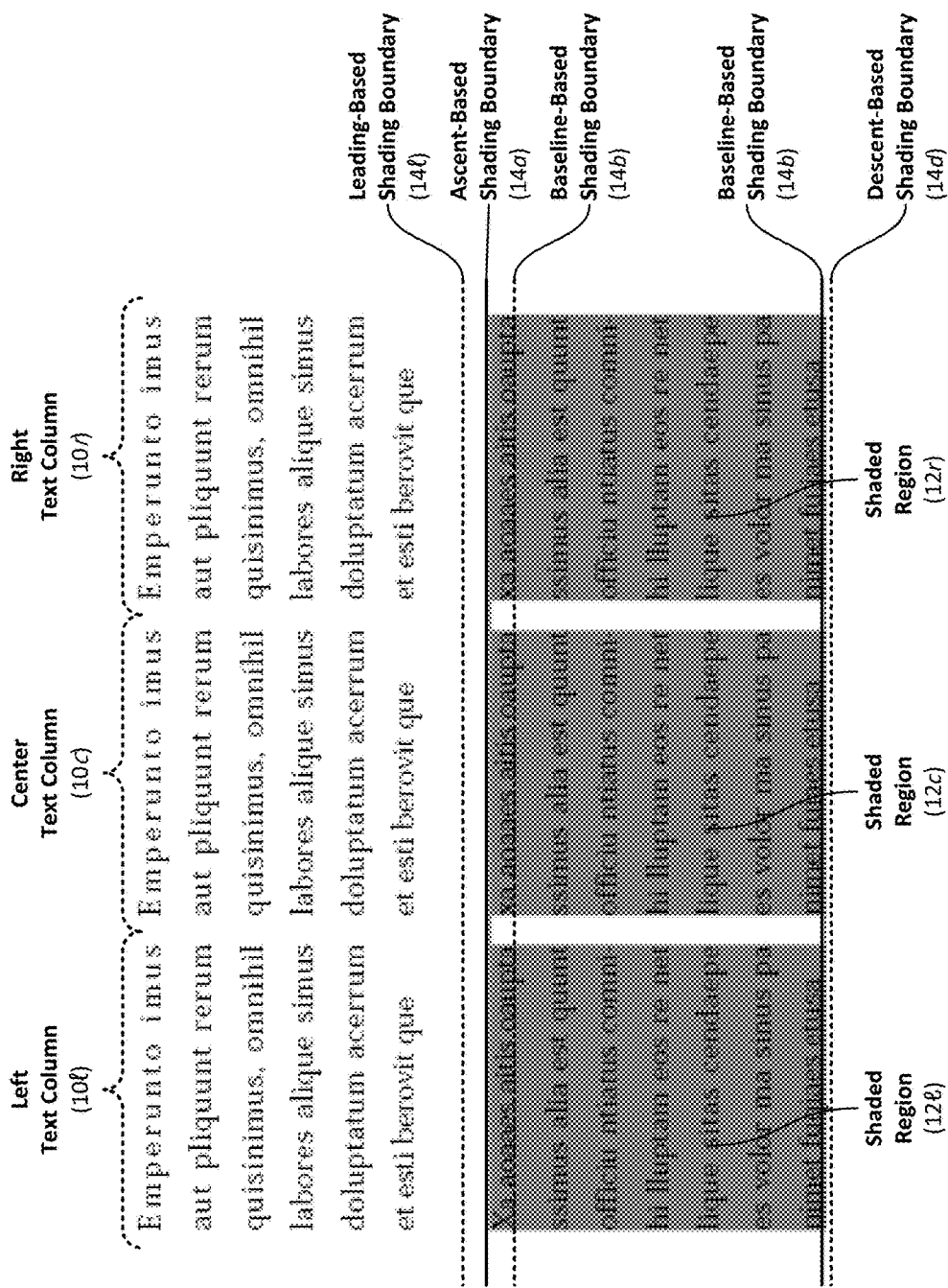

FIG. 2

Et hariasi tatempost

Unda int utem quis molupta earum haris dolenistinto quo dolorectia coratempos qui seruptatem aut reped escia derupta tempossi as nil maio te cusaecea parunda voluptatiis sum atempor re ationuntem faccatur?

Upper Paragraph (28u) — Ore labor aut lacepudit re nati con pero cumquiae. Unt amus, cus enim fugiaerfero volorep esperovid ea ex perisquate ommodit volutectis volo cullant optaturio. Ullantem reperit doluptat pro maio. Nem sandi aut vitio cum volore maio etur reic te nus, audae voles commimi ex et id molumqui iandis ut officate voluptatis rerit audit asitin porae corit venda core, insam id estiorat.

Frame Width Background Shading (24)

Lauda ne maionem et fugitatinto tem dolupta dolor as no bit magnati onseque con nus nonserchit latinciis excerum quiam, sus simil is volores vellabo reprorist quos destiose nis aliqui illoremperes minctempor reiciis nimil incillam optatur eribea dolorer cilluptatis molupta tiuslipsanis nii eost, que sum quuntecequi dolupienim volut harchit ut.

Frame Boundary (22)

Text Boundary (20)

Frame Boundary (22)

Et hariasi tatempost

Unda int utem quis molupta earum haris dolenistinto quo dolorectia coratempos qui seruptatem aut reped escia derupta tempossi as nil maio te cusaecea parunda voluptatiis sum atempor re ationuntem faccatur?

Lower Paragraph (28ℓ) — Ore labor aut lacepudit re nati con pero cumquiae. Unt amus, cus enim fugiaerfero volorep esperovid ea ex perisquate ommodit volutectis volo cullant optaturio. Ullantem reperit doluptat pro maio. Nem sandi aut vitio cum volore maio etur reic te nus, audae voles commimi ex et id molumqui iandis ut officate voluptatis rerit audit asitin porae corit venda core, insam id estiorat.

Text Width Background Shading (26)

Lauda ne maionem et fugitatinto tem dolupta dolor as no bit magnati onseque con nus nonserchit latinciis excerum quiam, sus simil is volores vellabo reprorist quos destiose nis aliqui illoremperes minctempor reiciis nimil incillam optatur eribea dolorer cilluptatis molupta tiuslipsanis nii eost, que sum quuntecequi dolupienim volut harchit ut.

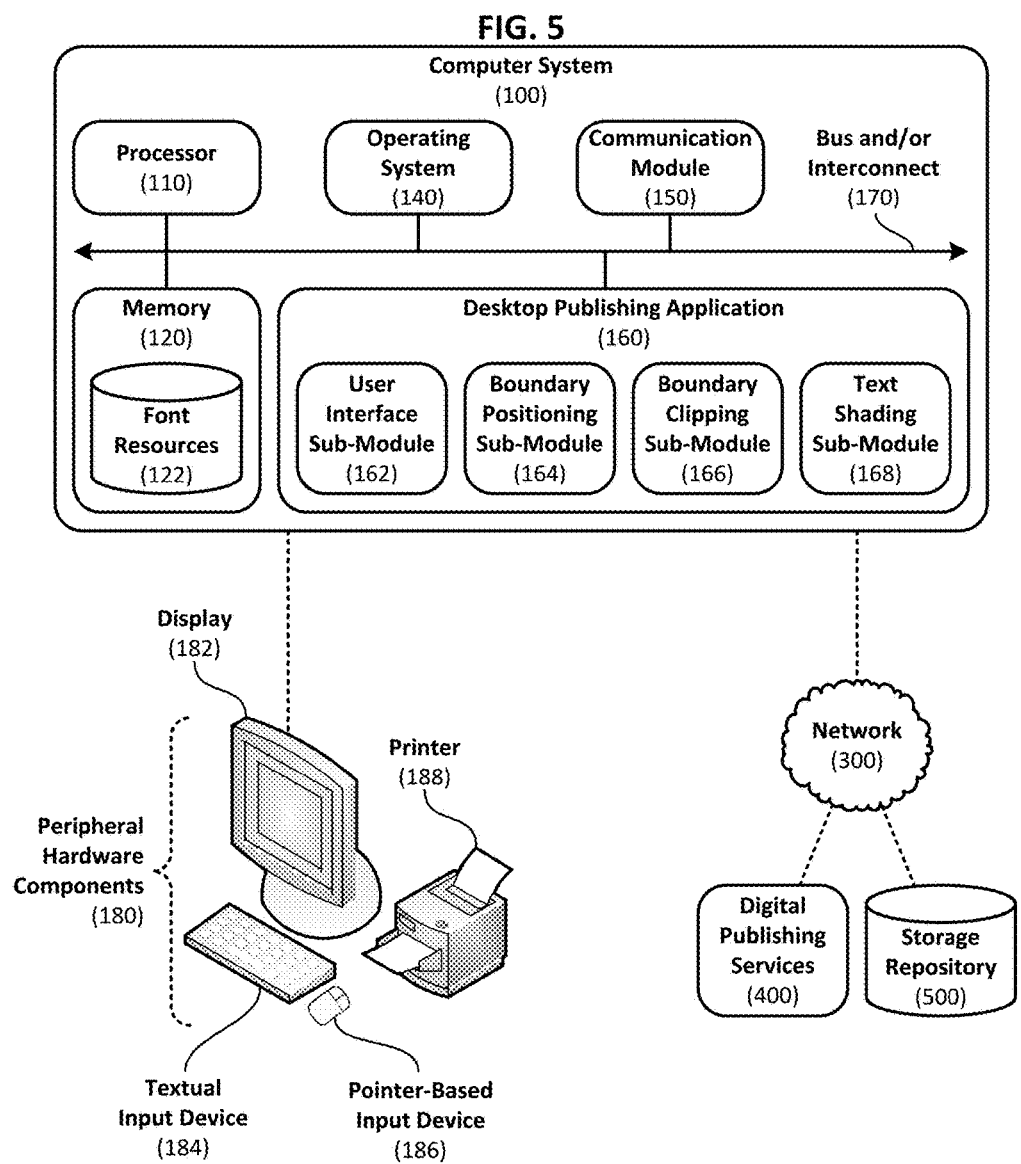

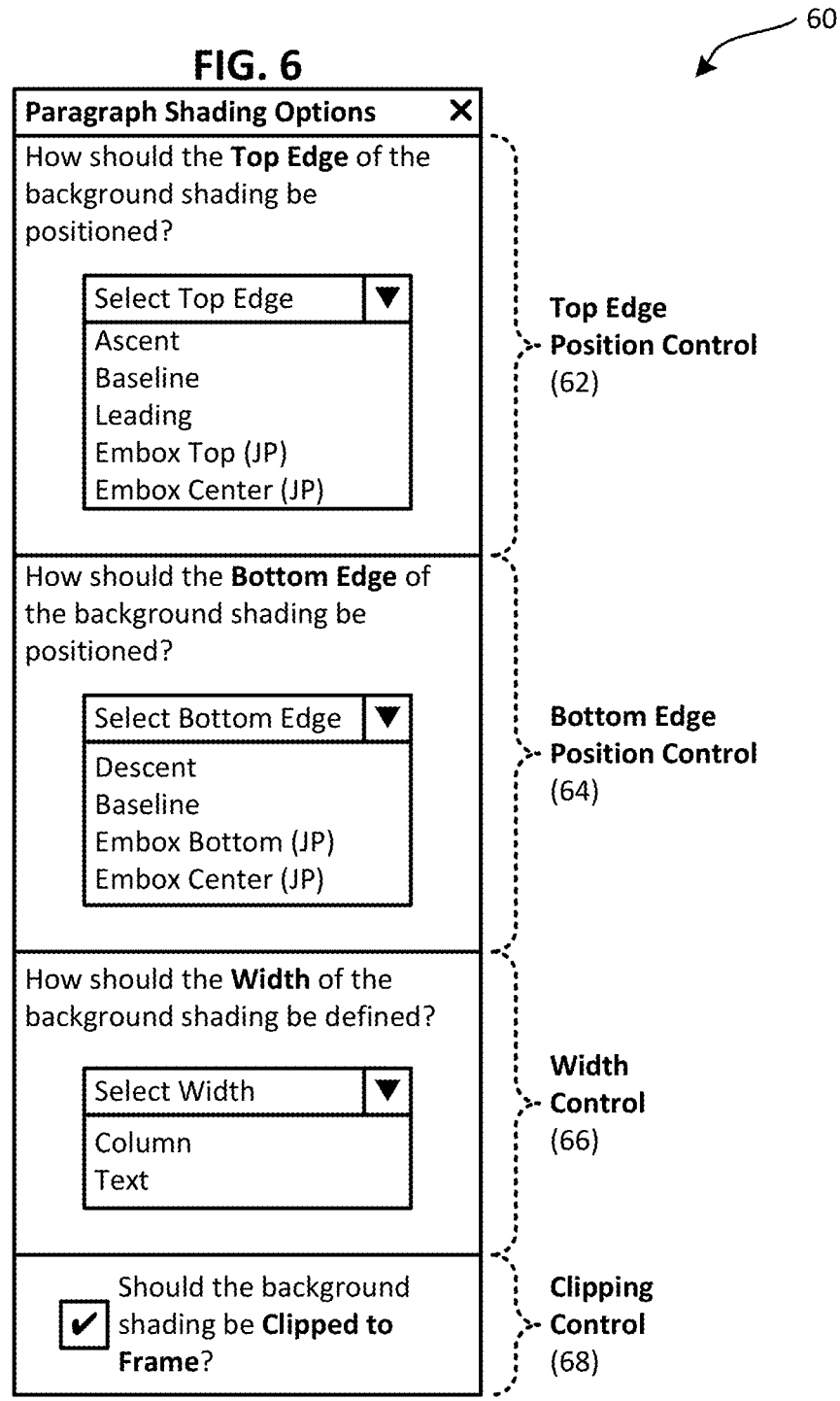

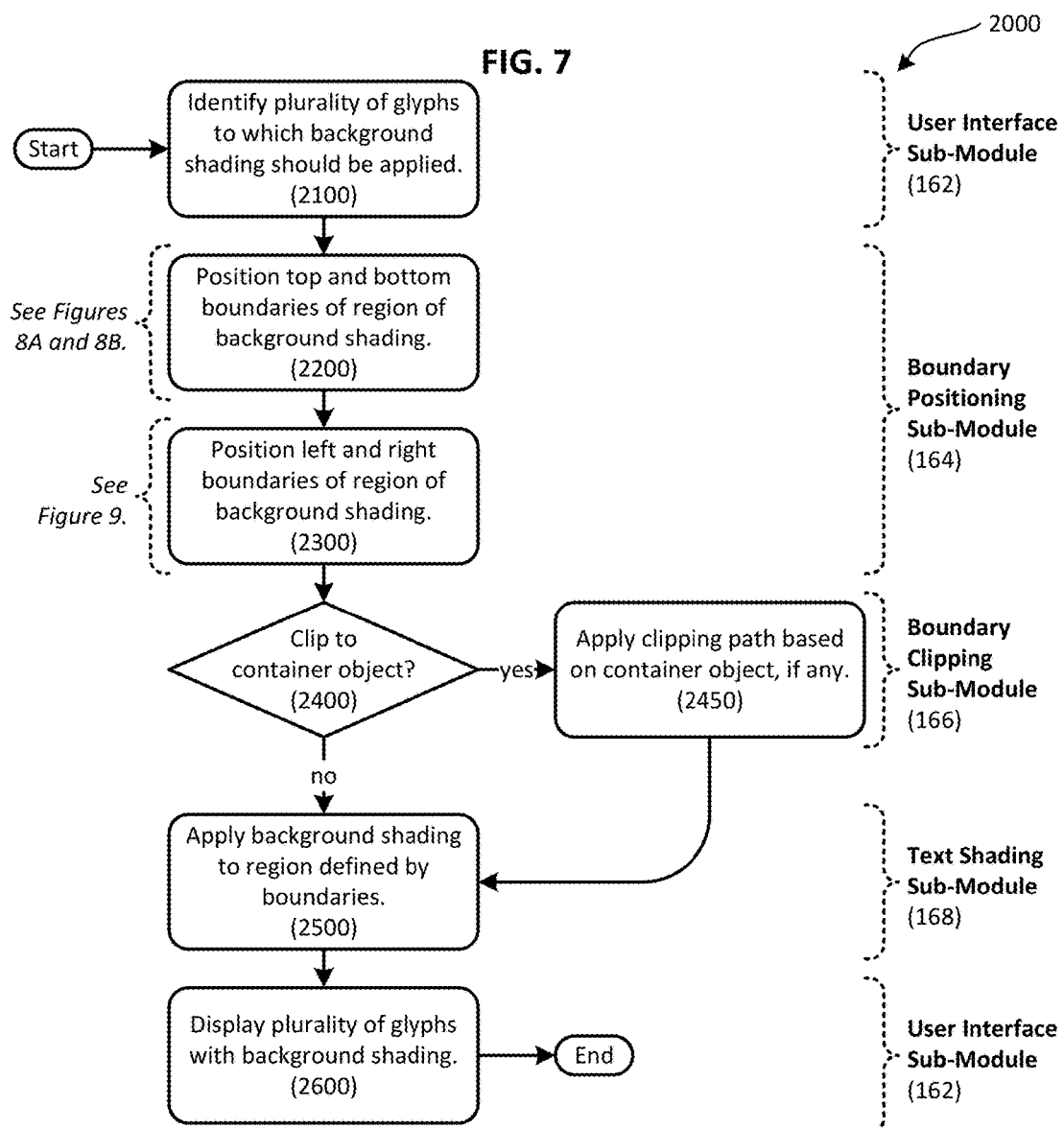

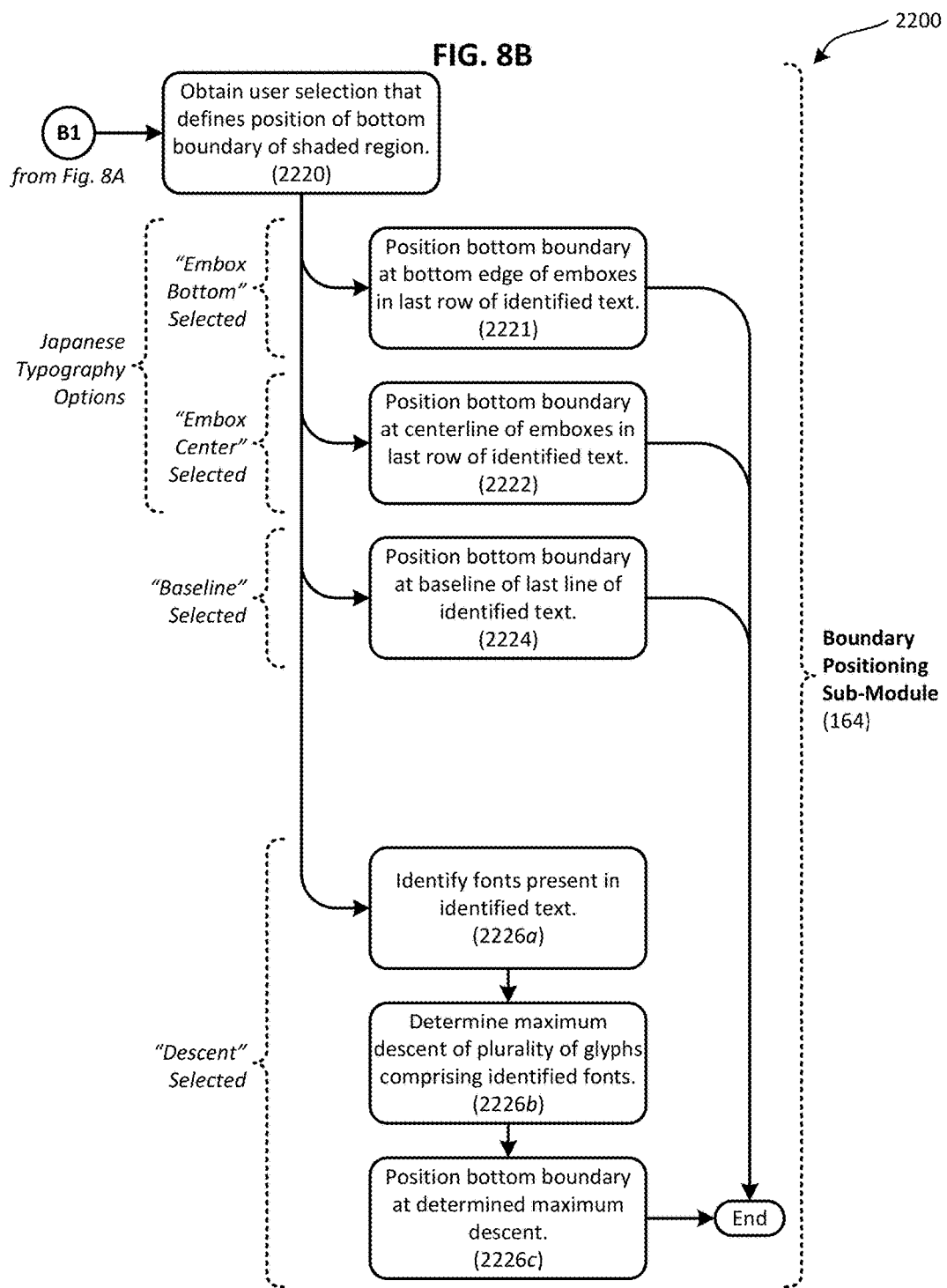

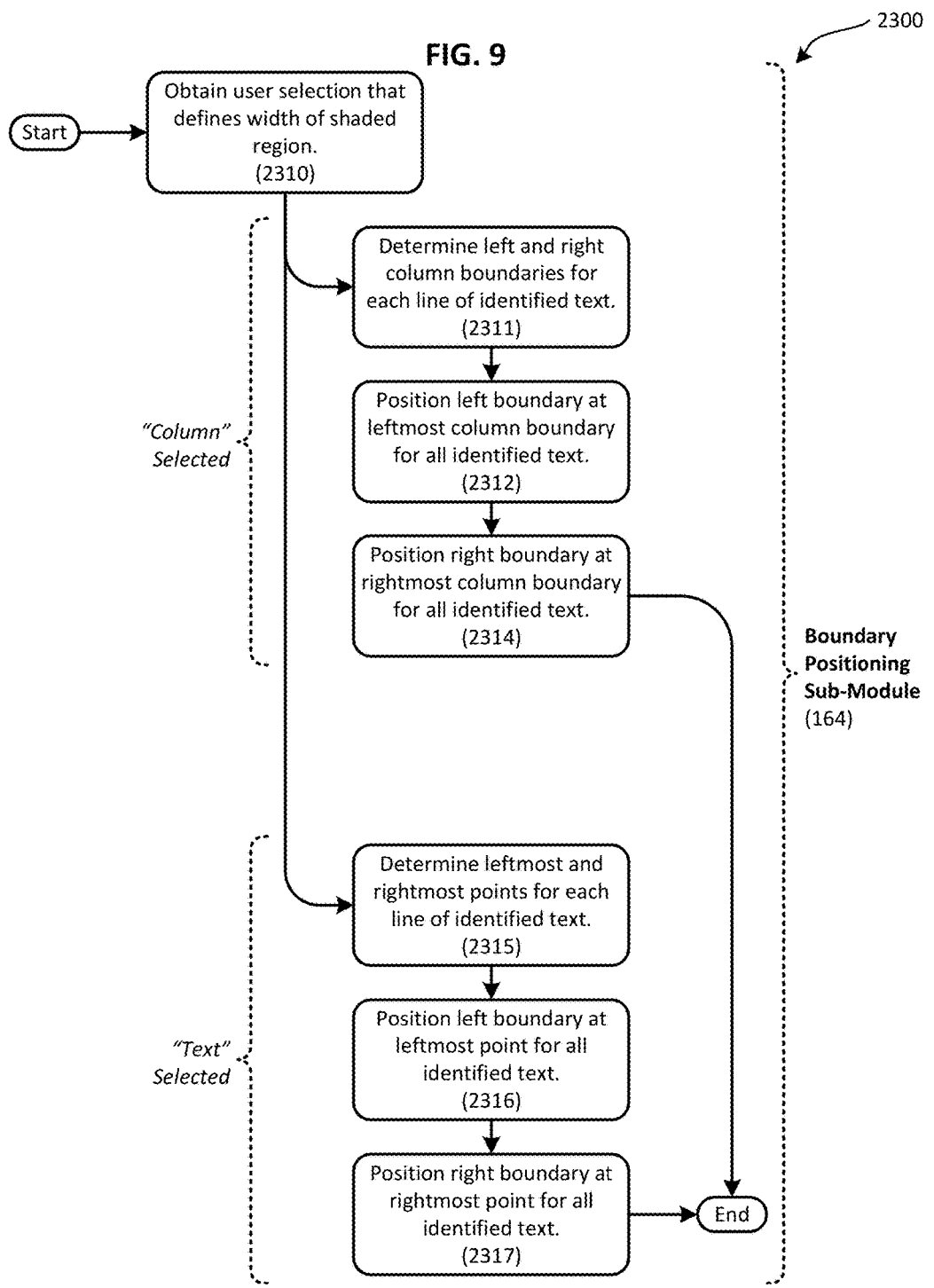

Receiving user input that defines a textual content segment that is to be located within a region of background shading, wherein the textual content segment comprises a first plurality of glyphs arranged in one or more lines.
(3100)

↓

Identifying a font associated with the first plurality of glyphs, wherein the identified font comprises a second plurality of glyphs.
(3200)

↓

Determining a maximum dimension associated with the second plurality of glyphs.
(3300)

↓

Positioning a boundary of the region of background shading at a distance from a baseline of a particular one of the lines, wherein the distance is based on the determined maximum dimension.
(3400)

↓

Displaying background shading in the region of background shading.
(3500)

ENHANCED PRECISION BACKGROUND SHADING FOR DIGITALLY PUBLISHED TEXT

FIELD OF THE DISCLOSURE

This disclosure relates generally to digital publishing, and more specifically to techniques for precisely and reliably positioning boundaries that define a region of background shading that is applied to digitally published text.

BACKGROUND

Digital publications are becoming increasingly ubiquitous. Instead of purchasing and physically acquiring tangible objects such as books, magazines, and newspapers, consumers are increasingly turning to online application stores that allow them to acquire, view, and/or purchase digital publications. As consumer demand for digitally published content has grown, numerous desktop publishing applications have been developed that allow digital publishers to precisely control the appearance of the textual and graphical objects that comprise a digital publication. In particular, compared to textual composition applications such as word processors and text editors, desktop publishing applications afford digital publishers a greater degree of control over visual aspects of digital content such as typography and graphical layout. Desktop publishing applications therefore enable digital publishers and other content designers to create digital content that has a visually attractive appearance in terms of composition, color, transparency, borders, typography, graphical layout, and so forth. Examples of commercially available desktop publishing applications include Adobe® InDesign® (Adobe Systems Incorporated, San Jose, Calif.) and Microsoft® Publisher (Microsoft Corporation, Redmond, Wash.).

Particularly with respect to typography, desktop publishing applications provide typesetting tools that allow digital publishers to create textual content that is uniformly legible, readable, and visually pleasing when rendered. For example, the typesetting tools provided by desktop publishing applications allow digital publishers to manipulate typographical attributes such as font, point size, line length, line spacing, margins, letter spacing, kerning, and the like. One typographical attribute that is particularly important to the creation of visually attractive textual content is background shading. Background shading can be used to draw attention to textual content, impart a degree of organization to textual content, or simply enhance the visual appearance of textual content. As a result, many existing desktop publishing applications also allow background shading to be applied to textual content, and to this end, are capable of positioning boundaries that define a region of background shading.

BRIEF DESCRIPTION OF THE DRAWINGS

FIG. 1B illustrates three text columns, each of which includes a shaded region defined by top and bottom boundaries that are positioned based on the shape of the glyphs that comprise the fonts present in each shaded region.

FIG. 2 illustrates a text column having an upper paragraph to which frame width background shading has been applied, and a lower paragraph to which text width background shading has been applied.

FIG. 5 is a block diagram schematically illustrating selected components of an example computer system that can be used to position boundaries that define a region of background shading that is applied to digitally published text.

FIG. 6 illustrates an example user interface that can be used to define how background shading is applied to digitally published text.

FIG. 7 is a flowchart illustrating an example method for positioning boundaries that define a region of background shading that is applied to digitally published text.

FIGS. 8A and 8B comprise a flowchart illustrating an example method for positioning top and bottom boundaries of a region of background shading that is to be applied to digitally published text.

FIG. 9 is a flowchart illustrating an example method for positioning left and right boundaries of a region of background shading that is to be applied to digitally published text.

FIG. 10 is a flowchart illustrating a computer-implemented method for applying background shading to textual content.

DETAILED DESCRIPTION

Figure 1A:
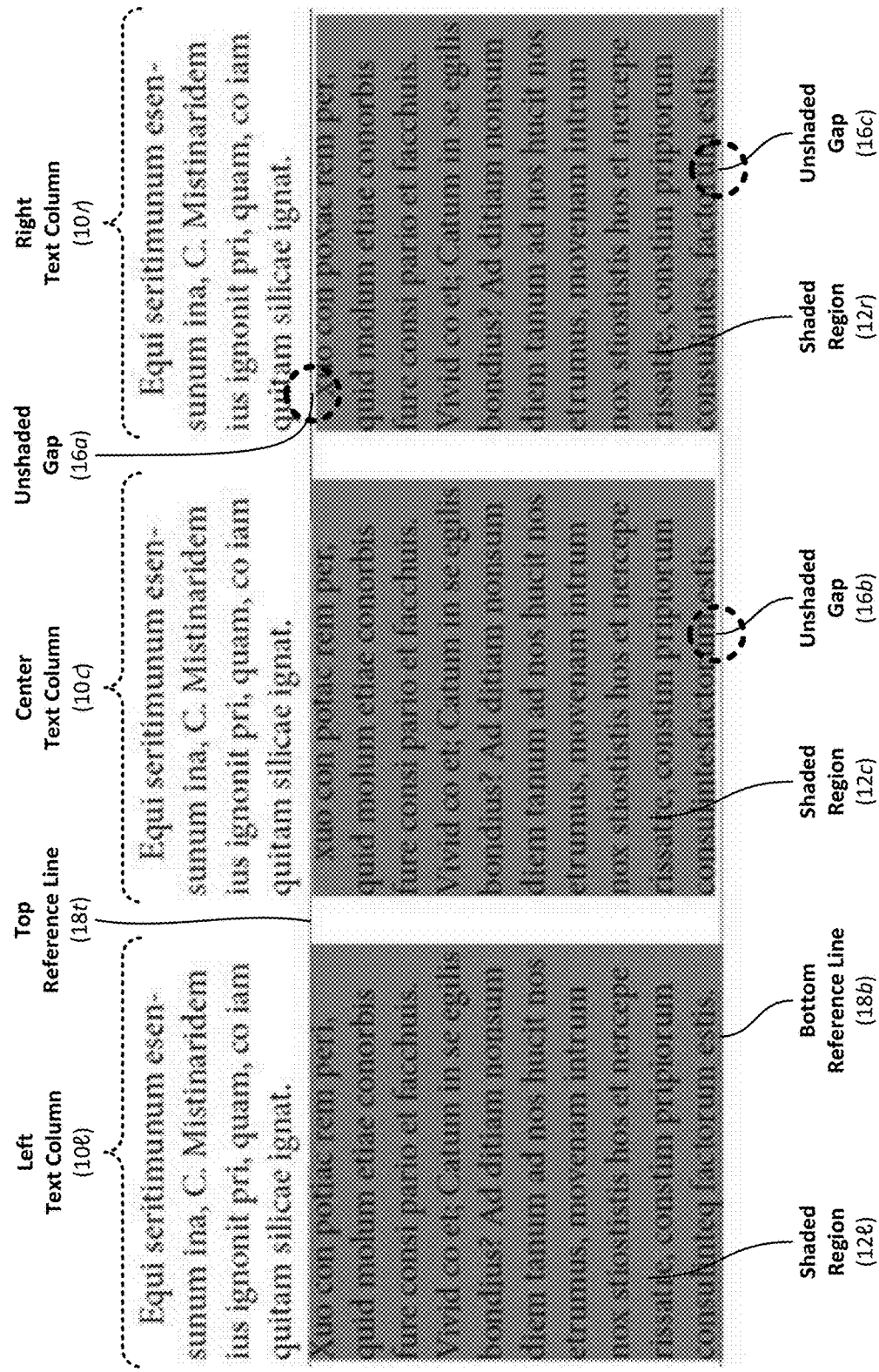
FIG. 1A illustrates three text columns, each of which includes a shaded region defined by top and bottom boundaries that are positioned based on the shape of the glyphs present in the first and last lines of text in each shaded region.

Because textual content is often arranged in rectangular blocks, positioning the boundaries of a region of background shading usually involves positioning top, bottom, left, and right boundaries of the shaded region. While many existing desktop publishing applications allow background shading to be applied to textual content, such applications cannot precisely and reliably position the boundaries of the shaded region, thus making it difficult for a digital publisher to achieve a desired background shading effect. Existing desktop publishing applications also cannot accurately apply background shading to non-rectangular (that is, arbitrarily-shaped) regions of textual content. In view of these shortcomings, disclosed herein are various techniques for more precisely and reliably (a) positioning top and bottom boundaries of a region of background shading, (b) positioning left and right boundaries of a region of background shading, (c) defining a region of background shading that is applied to Chinese, Japanese, or Korean characters, and (d) applying a clipping path to achieve an arbitrarily-shaped region of background shading. The various techniques disclosed herein allow background shading to be applied to textual content precisely and reliably, and also reduce the likelihood that unwanted visual artifacts are introduced into a digital publication.

Thus, in accordance with certain of the embodiments disclosed herein, improved background shading techniques enable a user to apply background shading to textual content more precisely and reliably. To accomplish this, first user input is received that identifies the textual content to which background shading is to be applied. And second user input is received that defines how a boundary of the background shading should be positioned with respect to the identified textual content. Because the second user input is distinct from the first user input, it provides an additional degree of precision beyond simply selecting a character, line, paragraph, or other segment of textual content. Once the textual content has been identified and the boundary of the region which is to be shaded has been positioned, the background shading can be applied accordingly. Numerous configurations and modifications will be apparent in light of this disclosure.

General Overview: Top and Bottom Boundaries

Existing desktop publishing applications position the top and bottom boundaries of a region of background shading based on the shape of the glyphs present in the first and last lines of text in the shaded region. For example, a line of text having a glyph with a relatively large ascent (that is, tall glyphs such as "b", "d", and "f") will have a larger region of background shading than a line of text having only glyphs with relatively small ascent (that is, short glyphs such as "a", "c", and "e"). Likewise, a line of text having glyphs with a descent (that is, glyphs such as "g", "j", and "p") will have a larger region of background shading than a line of text having only glyphs with no descent (that is, glyphs such as "m", "n", and "o"). Defining the region of background shading in this way means that changing a single glyph in the first or last line of text in the shaded region may cause the boundaries of the shaded region to change. This may produce unexpected changes in the geometry of the shaded region, which are particularly undesirable in applications where a digital publisher wishes to define the shaded region precisely and reliably.

This effect is shown in FIG. 1A, which illustrates a left text column 10*l* having a shaded region 12*l*, a center text column 10*c* having a shaded region 12*c*, and a right text column 10*r* having a shaded region 12*r*. Each shaded region 12*l*, 12*c*, 12*r* is defined by top and bottom boundaries that are positioned based on the shape of the glyphs present in the first and last lines, respectively, of the text to which the background shading is applied. Because the first and last lines of text in each shaded region 12*l*, 12*c*, 12*r* contain different glyphs, the top and bottom boundaries are positioned slightly differently in each text column 10*l*, 10*c*, 10*r*. For example, left text column 10*l* and center text column 10*c* contain glyphs with relatively large ascents ("X" and "t", respectively), while right text column 10*r* does not. The top boundaries of shaded regions 12*l*, 12*c* are therefore higher than the top boundary of shaded region 12*r*. This is evident when the three top boundaries are compared to a top reference line 18*t* that is uniformly drawn across all three columns 10*l*, 10*c*, 10*r*. In particular, an unshaded gap 16*a* is visible between top reference line 18*t* and shaded region 12*r*. Likewise, left text column 10*l* contains a glyph with a relatively large descent ("q"), while center text column 10*c* and right text column 10*r* do not. The bottom boundary of shaded region 12*l* is therefore lower than the bottom boundaries of shaded regions 12*c*, 12*r*. This is evident when the three bottom boundaries are compared to a bottom reference line 18*b* that is uniformly drawn across all three columns 10*l*, 10*c*, 10*r*. In particular, unshaded gaps 16*b*, 16*c* are visible between bottom reference line 18*b* and shaded regions 12*c*, 12*r*, respectively. Unshaded gaps 16*a*, 16*b*, 16*c* may intermittently appear, disappear, or change size depending on the particular glyphs present in the first and last lines of text to which background shading is applied. Unshaded gaps 16*a*, 16*b*, 16*c* are generally considered to be an unwanted visual distraction by many digital publishers.

Disclosed herein are various techniques for precisely and reliably positioning top and bottom boundaries that define a region of background shading that is applied to textual content. For example, in certain embodiments unshaded gaps 16*a*, 16*b*, 16*c* are eliminated by positioning the top and bottom boundaries of shaded regions 12*l*, 12*c*, 12*r* based on the shape of the glyphs that comprise the fonts present in each shaded region 12*l*, 12*c*, 12*r*. One implementation of this solution is illustrated in FIG. 1B. The top boundaries of shaded regions 12*l*, 12*c*, 12*r* are aligned with an ascent-based shading boundary 14*a* which is positioned based on the shapes of all of the glyphs that comprise the fonts present in each shaded region 12*l*, 12*c*, 12*r*. More particularly, ascent-based shading boundary 14*a* is positioned based on the glyph with the largest ascent from amongst all the glyphs that comprise all the fonts within shaded regions 12*l*, 12*c*, 12*r*. The bottom boundaries of shaded regions 12*l*, 12*c*, 12*r* are aligned with a baseline-based shading boundary 14*b*, which is positioned at the baseline of the last line of text in each shaded region 12*l*, 12*c*, 12*r*. This causes the shading in each text column 10*l*, 10*c*, 10*r* to have identical top and bottom boundaries, thus eliminating unshaded gaps 16*a*, 16*b*, 16*c*. It also means that the top and bottom boundaries are unaffected by changes in the glyphs present in the first or last lines of shaded regions 12*l*, 12*c*, 12*r*. This allows the background shading to be applied precisely and reliably, thus making it easier for digital publishers to achieve a desired background shading effect.

General Overview: Left and Right Boundaries

Desktop publishing applications can be understood as positioning text in a text frame having a size and position that can be manipulated according to user preference. When background shading is applied to the text within the text frame, existing desktop publishing applications position the left and right boundaries of the shaded region such that they coincide with the left and right boundaries of the text frame. However, in many cases the left and right boundaries of the text do not actually coincide with the left and right boundaries of the text frame. For example, text can be aligned to the left, right, or center of the text frame, or at an arbitrary position within the text frame. The text frame may have an internal margin. Because of factors such as these, a gap may exist between the edge of the text and the edge of the text frame. If the background shading is applied to the text frame without regard to how text is positioned therein, this gap will be shaded, even though it contains no text. This effect is shown in FIG. 2, which illustrates a text column having an upper paragraph 28*u* to which frame width background shading 24 has been applied. Frame width background shading 24 extends to frame boundary 22, regardless of the fact that the text does not. For a digital publisher who wishes to shade only textual content, the presence of this shaded region having no text will be undesirable. Existing desktop publishing applications therefore make it difficult for a digital publisher to precisely position left and right boundaries of a region of background shading.

Disclosed herein are various techniques for precisely and reliably positioning right and left boundaries that define a region of background shading that is applied to textual content. For example, in certain embodiments the aforementioned shaded region having no text is eliminated by positioning the left and right boundaries of the shaded region along a text boundary 20 that corresponds to how the text is actually positioned within the text frame. This solution is also shown in FIG. 2. In particular, the text column illustrated in FIG. 2 includes a lower paragraph 28*l* to which text width background shading 26 has been applied. Text width background shading 26 extends only to text boundary 20, thus eliminating shading from the region that is between text boundary 20 and frame boundary 22, and that contains no text. Certain embodiments allow a digital publisher to choose whether to apply frame width background shading 24 or text width background shading 26 to specified textual content. This allows the background shading to be applied precisely and reliably, thus making it easier for the digital publisher to achieve a desired background shading effect.

General Overview: Applying Background Shading to CJK Characters

The aforementioned challenges associated with precisely controlling how background shading is applied to textual content may be exacerbated when typesetting glyphs which are arranged in a frame grid as opposed to along a baseline. Arranging glyphs in a frame grid results in each glyph being placed in a dedicated grid box, also referred to as an "embox". Chinese, Japanese, and Korean (CJK) characters are often typeset in this way, although other character sets associated with other languages may be aligned in emboxes as well. Existing desktop publishing applications position the boundaries of a region of background shading based on the shape of the glyphs that are present along the edges of the shaded region. When applied to glyphs arranged in a frame grid, the background shading therefore will not necessarily extend to the embox edges. The result is that the boundaries of the shaded region may vary depending on which glyphs are present along the edges of the shaded region. Changing a single glyph along an edge of the shaded region may cause the boundaries of the shaded region to shift. This may produce unexpected changes in the geometry of the shaded region, which are particularly undesirable where a digital publisher wishes to define the shaded region precisely and reliably.

Figure 3A:
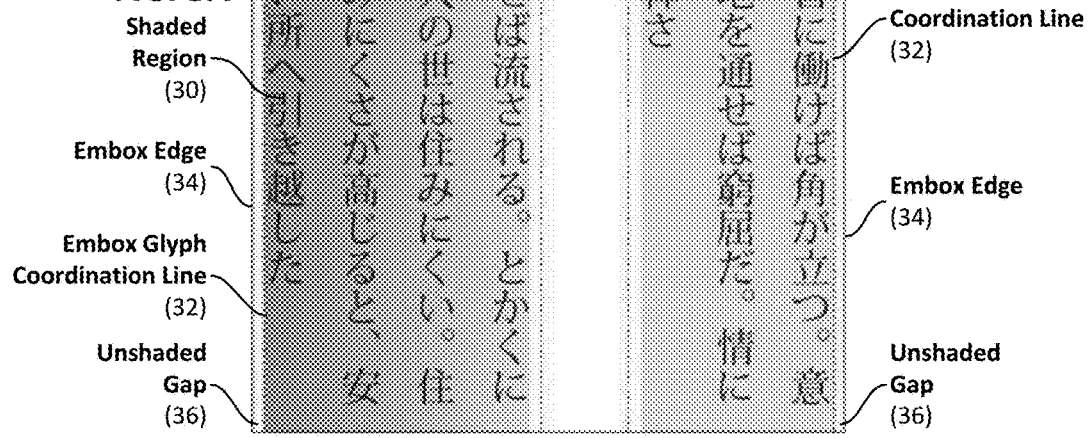
FIG. 3A illustrates Japanese characters within a shaded region defined by boundaries that are positioned based on the shape of the glyphs located along the edges of the shaded region.

This effect is shown in FIG. 3A, which illustrates Japanese text within a shaded region 30 that is defined by boundaries that are based on the shape of the glyphs located along the edges of shaded region 30. In particular, the background shading does not extend past an embox glyph coordination line 32 which corresponds to the furthest extent of the glyphs positioned along a given edge of the text. The result is an unshaded gap 36 located between the glyph edges and embox edges 34. Unshaded gap 36 may intermittently appear, disappear, or change size depending on the particular glyphs present along the edges of shaded region 30. Its presence is generally considered to be an unwanted visual distraction by many digital publishers.

Figure 3B:
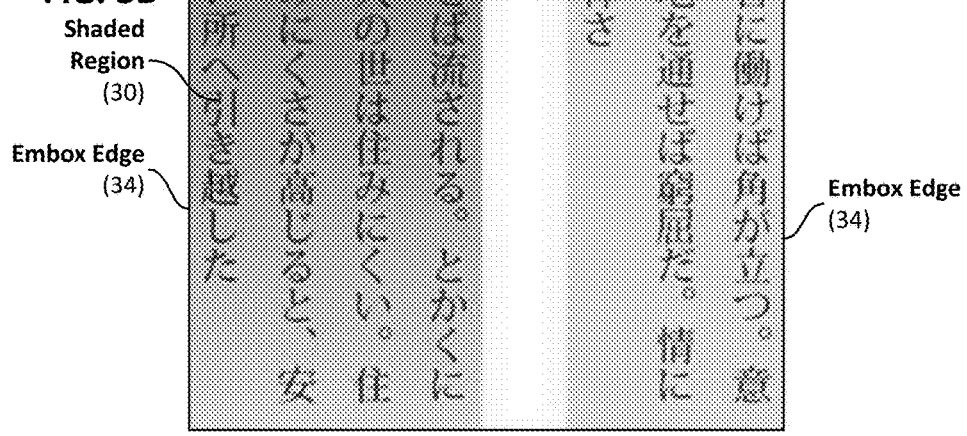
FIG. 3B illustrates Japanese characters within a shaded region that fills emboxes containing the Japanese characters.

Disclosed herein are various techniques for precisely and reliably positioning boundaries that define a region of background shading that is applied to characters, such as CJK characters, which are aligned in emboxes. For example, in certain embodiments unshaded gap 36 is eliminated by shading the entire embox associated with each glyph to which background shading is to be applied. The boundaries of shaded region 30 will thus coincide with embox edges 34, as illustrated in FIG. 3B. This allows the background shading to be applied precisely and reliably, thus making it easier for digital publishers to achieve a desired background shading effect.

General Overview: Arbitrarily-Shaped Background Shading Regions

Figure 4A:
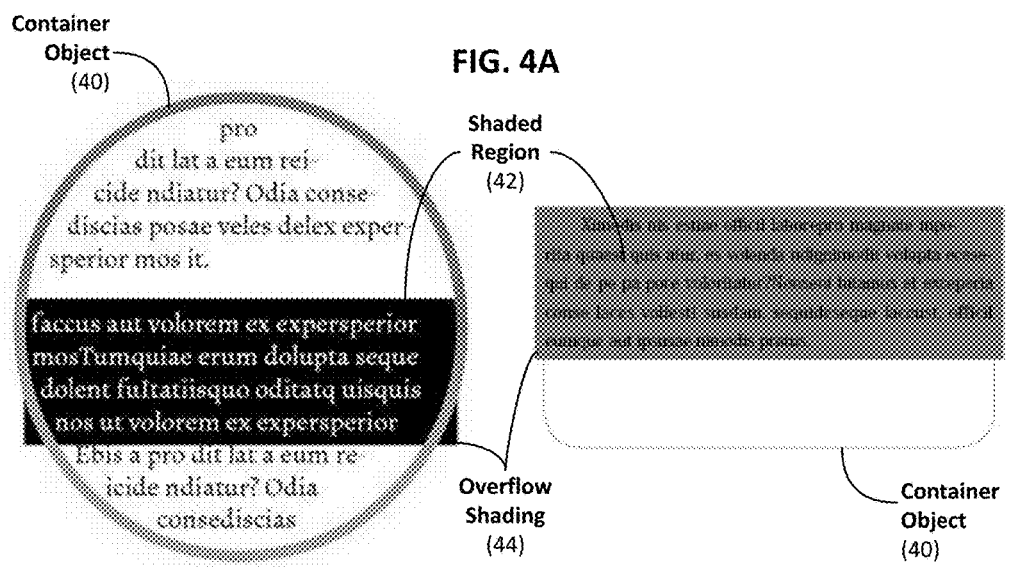
FIG. 4A illustrates text that is positioned within a container object, wherein the text has background shading that extends outside the container object.
Figure 4B:
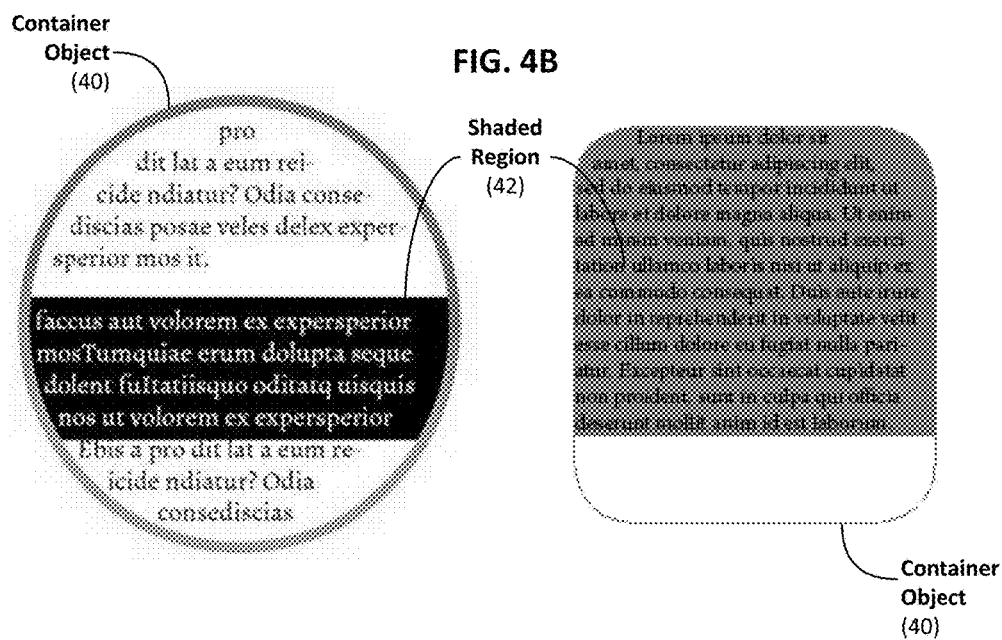
FIG. 4B illustrates text that is positioned within a container object, wherein the text has background shading that is contained within the container object.

Existing desktop publishing applications are unable to conform background shading to an arbitrarily-shaped object that contains textual content. As a result, the background shading may overrun the container object. This effect is shown in FIG. 4A, which illustrates a shaded region 42 that is positioned within a container object 40, wherein overflow shading 44 extends outside container object 40. Preferably, the background shading would not extend outside container object 40, as illustrated in FIG. 4B. Disclosed herein are various techniques for precisely and reliably applying background shading to an arbitrarily-shaped object that contains textual content. For example, in certain embodiments a clipping path is applied to shaded region 42, wherein the clipping path is defined by the geometry of container object 40. This allows the shaded region 42 to conform to an arbitrarily-shaped container object 40, thus providing digital publishers with greater versatility in applying background shading, and making it easier for them to achieve a desired background shading effect.

General Overview: Definitions

While the various techniques disclosed herein are often described as being used by a digital publisher using a desktop publishing application to manipulate a digital publication, it will be appreciated that such techniques may be implemented using a wide variety of software applications including word processors, spreadsheet applications, presentation applications, photo editors, electronic mail clients, and any other software capable of manipulating digital content. It will also be appreciated that such techniques can be used by not only digital publishers, but indeed by any other user seeking to more precisely and reliability define how background shading is to be applied to textual content.

As used herein the term "glyph" refers, in addition to its ordinary meaning, to a typographical element that can be understood as including one or more characters. Thus a paragraph can be understood as including a plurality of glyphs arranged in one or more lines. More generally, textual content can be understood as including a plurality of glyphs, and therefore the terms "textual content" and "plurality of glyphs" may be used interchangeably herein. In many cases, a one-to-one correspondence exists between glyphs and characters, such as in the case of the character "a" being represented by the glyph "a". However in some cases a combination of multiple characters can be represented by a single glyph. For instance, the characters "o" and "e" can be combined and represented by the single glyph "œ". Similarly, the characters "f" and "l" can be combined and represented by glyphs such as "ffl" or "fl". As yet another example, the Arabic characters "ف" and "ي" can be combined and represented by the single glyph "ڤ". The term "ligature" refers to the action of binding two characters together to form a glyph, and therefore the terms "glyph" and "ligature" are often used interchangeably when referring to glyphs that correspond to multiple characters. Although ligatures are used in a wide range of languages, they are particularly common in Arabic.

As used herein the term "font resource" refers, in addition to its ordinary meaning, to information that defines a particular font with sufficient specificity such that the font may be rendered using appropriate software. Such software may include, for example, an operating system, an application such as a word processor or a desktop publishing application, or a device driver that is capable of controlling hardware. A font resource may define a set of glyphs, characters, or symbols using a matrix of dots (in the case of bitmap fonts) or a collection of lines and/or curves (in the case of outline and stroke fonts). The digital information that comprises a font resource can be organized and stored according to a variety of different standards, such as the Glyph Bitmap Distribution Format (BDF) for bitmap fonts, the PostScript (PS) format for outline fonts, or the Metafont description language for stroke fonts. Other proprietary or open source formats can be used in other embodiments, and thus it will be appreciated that the various embodiments disclosed herein are not limited to use of font resource data that is stored in any particular format.

As used herein, the term "background shading" refers, in addition to its ordinary meaning, to a field that is applied behind a foreground element. For example, in certain of the embodiments disclosed herein background shading is applied behind textual content or a frame containing textual content. Background shading may also be applied behind non-textual elements. The field used in background shading may comprise a solid color field, a color field having a gradient, a pattern, or any other suitable appearance. Where background shading comprises a color field, virtually any color can be used, including black, white, and transparent. Background shading may have a degree of transparency, such that additional elements or graphical features located behind the background shading field, such as a watermark, may be at least partially visible. Background shading can be represented by metadata in a wide range of digital formats, including the electronic publication (EPUB) format and hypertext markup language (HTML). The various techniques for applying background shading that are disclosed herein can be applied to background shading generally, and thus are not intended to be limited to any particular type of background shading.

System Architecture

FIG. 5 is a block diagram schematically illustrating selected components of an example computer system 100 that can be used to position boundaries that define a region of background shading that is applied to digitally published text. Computer system 100 may comprise, for example, one or more devices selected form a desktop computer, a laptop computer, a workstation, a tablet computer, a smartphone, a handheld computer, a set-top box, an enterprise class server, or any other such computing derive. A combination of different devices may be used in certain embodiments. In the illustrated embodiment, computer system 100 includes, among other things, a processor 110, a memory 120, an operating system 140, a communication module 150, and a desktop publishing application 160. As can be further seen a bus and/or interconnect 170 is also provided to allow for inter- and intra-device communications using, for example, communication module 150.

Depending on the particular type of device used for implementation, computer system 100 is optionally coupled to or otherwise implemented in conjunction with, one or more peripheral hardware components 180. Examples of peripheral hardware components 180 include a display 182, a textual input device 184 (such as a keyboard), a pointer-based input device 186 (such as a mouse), and a printer 188 (or other output device). One or more other input/output devices, such as a touch sensitive display, a speaker, a scanner, a printer capable of generating a three-dimensional object (often colloquially referred to as a "3D printer"), or a microphone, can be used in other embodiments. For example, in a particular alternative embodiment wherein computer system 100 is implemented in the form of a tablet computer, certain functionality associated with the particular peripheral hardware components 180 illustrated in FIG. 5 is provided instead by a touch sensitive display and a camera that forms part of the tablet computer. In general, computer system 100 may be coupled to a network 300 to allow for communications with other computing devices or resources, such as remotely-provisioned digital publishing services 400 and/or a networked storage repository 500. Other components and functionality not reflected in the schematic block diagram of FIG. 5 will be apparent in light of this disclosure and thus it will be appreciated that other embodiments are not limited to any particular hardware configuration.

Processor 110 can be any suitable processor, and may include one or more coprocessors or controllers, such as an audio processor or a graphics processing unit, to assist in processing operations of computer system 100. Memory 120 can be implemented using any suitable type of digital storage, such as one or more of a disk drive, a universal serial bus drive, flash memory, and random access memory. Memory 120 can be used to store font resources 122 that define the various fonts used by software such as desktop publishing application 160, although font resources 122 may additionally or alternatively be stored in networked storage repository 500. Operating system 140 may comprise any suitable operating system, such as Google Android (Google Inc., Mountain View, Calif.), Microsoft Windows (Microsoft Corp., Redmond, Wash.), Apple iOS (Apple Inc., Cupertino, Calif.), or Apple OS X (Apple Inc., Cupertino Calif.). As will be appreciated in light of this disclosure, the techniques provided herein can be implemented without regard to the particular operating system provided in conjunction with computer system 100, and therefore may also be implemented using any suitable existing or subsequently developed platform. Communication module 150 can be any appropriate network chip or chipset which allows for wired and/or wireless communication via network 300 to external resources such as digital publishing services 400 and networked storage repository 500. Bus and/or interconnect 170 may also be provided to allow for inter- and intra-device communications using, for example, communication module 150.

Desktop publishing application 160 comprises any suitable computer software application that enables users to create and manipulate a wide range of digital content, including digital publications, textual documents, graphical layouts, and the like. To this end, desktop publishing application 160 includes a wide range of functionality that allows visual aspects of both graphical and textual content to be manipulated. Particularly with respect to textual content, desktop publishing application 160 includes typography tools that allow background shading to be applied to textual content, as will be described in turn. Desktop publishing application 160 is capable of manipulating digital content that is stored both locally (for example, in memory 120) as well as remotely (for example, in networked storage repository 500). Examples of commercially available desktop publishing applications include Adobe® InDesign® (Adobe Systems Incorporated, San Jose, Calif.) and Microsoft® Publisher (Microsoft Corporation, Redmond, Wash.).

In certain embodiments desktop publishing application 160 is installed local to computer system 100, as illustrated in the example embodiment of FIG. 5. However, in alternative embodiments computer system 100 is implemented in a client-server computing environment wherein at least a portion of desktop publishing application 160 is provided to computer system 100 using an applet, such as a JavaScript applet, or other downloadable module. Such a remotely-provisioned module can be provided in real-time in response to a request from computer system 100 for access to a server having resources that are of interest to a user of computer system 100, such as remotely-provisioned digital publishing services 400. The server, if applicable, may be local to network 300 or may be remotely coupled to network 300 by one or more other networks or communication channels. In any such standalone or networked computing scenarios, desktop publishing application 160 can be implemented with any suitable combination of technologies that allow a user to create and manipulate digital publications.

Still referring to the example embodiment illustrated in FIG. 5, desktop publishing application 160 includes a user interface sub-module 162. User interface sub-module 162 comprises instructions encoded on a computer readable medium that, when executed using a processor, cause a user interface to be generated. The user interface is configured to receive user input that defines how background shading is to be applied to textual content. To this end, the user interface generated by user interface sub-module 162 may include elements such as menu bars, toolbars, dialog boxes, control panels, dropdown menus, context menus, checkboxes, radio buttons, and the like.

FIG. 6 illustrates an example user interface 60 that can be used to define how background shading is applied to digitally published text. User interface 60 includes a top edge position control 62 that allows a user to select a particular basis for positioning the top boundary of a region of background shading, and a bottom edge position control 64 that allows a user to select a particular basis for positioning the bottom boundary of a region of background shading. Similarly, user interface 60 also includes a width control 66 that allows a user to select a particular basis for positioning the left and right boundaries of a region of background shading. The various bases for positioning the top, bottom, left, and right boundaries of the shaded region will be described in turn. In some implementations, one or more of top edge position control 62, bottom edge position control 64, and width control 66 include a user interface element that allows a numerical position to be input, thus providing even further control over the exact position of the boundaries of the shaded region. In certain embodiments user interface 60 also includes a clipping control 68 that allows a user to specify whether the region of background shading should be clipped to the shape of a text container object. The various user interface controls illustrated in FIG. 6 are exemplary, and thus other embodiments may have fewer, additional, or alternative controls.

The user interface generated by user interface sub-module 162 is also optionally configured to receive user input that characterizes the background shading itself, for example in terms of visual attributes such as color, gradient, transparency, pattern, and so forth. In certain embodiments the user interface is also capable of receiving a text selection that defines the particular textual content to which the background shading is to be applied. And in addition to receiving the various inputs described herein, the user interface can also be used to display digital content, and in particular, digital content to which background shading has been applied. User interface therefore allows a user to simultaneously define and visualize background shading.

In certain embodiments desktop publishing application 160 further includes a boundary positioning sub-module 164. Boundary positioning sub-module 164 comprises instructions encoded on a computer readable medium that, when executed using a processor, cause a boundary posi-tioning process to be invoked. The boundaries, which define a region of background shading, can be positioned based on a number of factors. For example, in one embodiment the boundaries are positioned based on the shape of the glyphs that comprise the fonts present in the identified textual content to which background shading is to be applied. Boundary positioning sub-module 164 is therefore capable of leveraging font resources 122 stored in memory 120 to evaluate the various glyphs that comprise a detected font. In some implementations the boundaries are positioned based on a user-specified boundary, such as a baseline-based shading boundary. Boundary positioning sub-module 164 is therefore also capable of leveraging user preferences received via, for example, a user interface generated by user interface sub-module 162. Furthermore, in applications where background shading is to be applied to glyphs which are arranged in a frame grid, as is often the case for CJK typesetting, the boundaries may be positioned in accordance with the edges of the emboxes that contain the glyphs to which background shading is to be applied.

Desktop publishing application 160 also optionally includes a boundary clipping sub-module 166. Boundary clipping sub-module 166 comprises instructions encoded on a computer readable medium that, when executed using a processor, cause a boundary clipping process to be invoked. The boundary clipping process can be used to conform background shading to an arbitrarily-shaped container object that contains textual content. In certain embodiments this is accomplished by applying a clipping path to the region that is defined by boundary positioning sub-module 164. In such embodiments the clipping path is defined by the geometry of the arbitrarily-shaped container object.

As noted above, desktop publishing application 160 includes typography tools that allow background shading to be applied to textual content. To this end, in one embodiment desktop publishing application 160 includes a text shading sub-module 168 that comprises instructions encoded on a computer readable medium that, when executed using a processor, cause a background shading process to be invoked. In one implementation, the background shading process causes background shading to be applied to the region defined by the aforementioned boundary positioning process, as optionally modified by the aforementioned boundary clipping process. Once the background shading is applied in accordance with the foregoing, the textual content with its underlying background shading can be displayed via the user interface generated by user interface sub-module 162.

Computer system 100 can communicate with the various networked resources described herein via network 300. Network 300 may be a local area network (such as a home-based or office network), a wide area network (such as the Internet), a peer-to-peer network (such as a Bluetooth connection), or a combination of such networks, whether public, private, or both. For example, in certain embodiments at least a portion of the functionality associated with network 300 is provided by a cellular data network, thereby making it easier for users of smartphones and tablet computers to leverage networked resources. In general, communications amongst the various entities and resources described herein may occur via wired and/or wireless connections, such as may be provided by Wi-Fi or mobile data networks. In some cases access to resources on a given network or computing system may require credentials such as a username and password, and/or may require compliance with any other suitable security mechanism.

The embodiments described herein can be implemented in various forms of hardware, software, firmware, and/or special purpose processors. For example, in one embodiment a non-transitory computer readable medium has instructions encoded thereon that, when executed by one or more processors, cause one or more of the background shading application methodologies described herein to be implemented. The instructions can be encoded using any suitable programming language, such as C, C++, object-oriented C, JavaScript, Visual Basic .NET, BASIC, or alternatively, using custom or proprietary instruction sets. Such instructions can be provided in the form of one or more computer software applications and/or applets that are tangibly embodied on a memory device, and that can be executed by a computer having any suitable architecture. In one embodiment the system can be hosted on a given website and implemented, for example, using JavaScript or another suitable browser-based technology.

The functionalities disclosed herein can optionally be incorporated into a variety of different software applications, such as desktop publishing applications, word processing applications, image editing software applications, and presentation applications. For example, an image editing application can be configured to apply background shading to text within a graphical object that forms part of a graphical image. The image processing application can therefore be configured to implement certain of the functionalities disclosed herein so as to allow such background shading to be applied to the text consistently and precisely. The computer software applications described herein may include a number of different modules, sub-modules, or other components of distinct functionality, and can provide information to, or receive information from, still other components and services. These modules can be used, for example, to communicate with peripheral hardware components 180, networked storage resources such as networked storage repository 500, or other external components. More generally, other components and functionality not reflected in the illustrations will be apparent in light of this disclosure, and it will be appreciated that the present disclosure is not intended to be limited to any particular hardware or software configuration. Thus in other embodiments the components illustrated in FIG. 5 may include additional, fewer, or alternative sub-components.

The aforementioned non-transitory computer readable medium may be any suitable medium for storing digital information, such as a hard drive, a server, a flash memory, and/or random access memory. In alternative embodiments, the computers and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and/or firmware can be used, and that the present disclosure is not intended to be limited to any particular system architecture.

Methodology: General Overview

FIG. 7 is a flowchart illustrating an example method 2000 for positioning boundaries that define a region of background shading that is applied to digitally published text, and then applying background shading to the defined region. As can be seen, method 2000 includes a number of phases and sub-processes, the sequence of which may vary from one embodiment to another. However, when considered in the aggregate, these phases and sub-processes form part of an improved digital publishing framework that is capable of precisely and reliably applying background shading to textual content. The techniques disclosed herein are responsive to user input in accordance with certain of the embodiments disclosed herein. Method 2000 can be implemented, for example, using the system architecture illustrated in FIG. 5 and described herein. However, other system architectures can be used in other embodiments, as will be apparent in light of this disclosure. To this end, the correlation of the various functionalities shown in FIG. 7 to the specific components illustrated in FIG. 5 is not intended to imply any structural and/or use limitations. Rather other embodiments may include, for example, varying degrees of integration wherein multiple functionalities are effectively performed by one system or module. For example, in an alternative embodiment a single module can be used to apply background shading to a defined region and display text over the applied background shading. Thus other embodiments may have fewer or more modules depending on the granularity of implementation. Numerous variations and alternative configurations will be apparent in light of this disclosure.

Figure 8A:
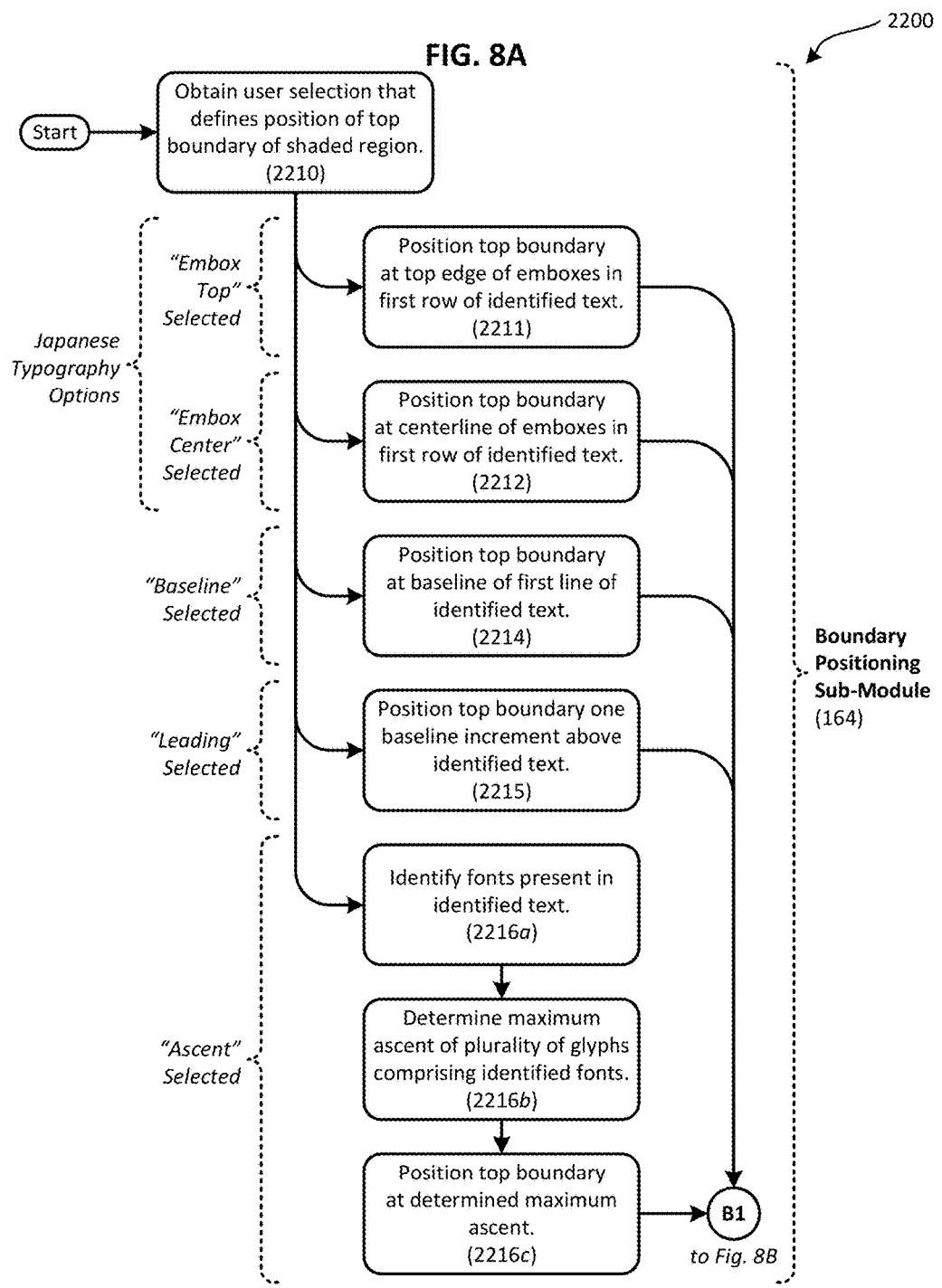

As illustrated in FIG. 7, method 2000 commences with identifying a plurality of glyphs to which background shading should be applied. See reference numeral 2100 in FIG. 7. The plurality of glyphs can be identified via the user interface generated by user interface sub-module 162. For example, in one embodiment a user highlights the text to which background shading is to be applied using pointer-based input device 186. Other text selection techniques can be used in other embodiments. Once the plurality of glyphs have been identified, the boundary positioning process invoked by boundary positioning sub-module 164 positions top and bottom boundaries of the region of background shading. See reference numeral 2200 in FIG. 7. One way of accomplishing this is illustrated in FIGS. 8A and 8B, which will be described in turn. The boundary positioning process invoked by boundary positioning sub-module 164 also positions left and right boundaries of the region of background shading. See reference numeral 2300 in FIG. 7. One way of accomplishing this is illustrated in FIG. 9, which will also be described in turn. In certain embodiments the boundary positioning process is responsive to user input received via one or more of top edge position control 62, bottom edge position control 64, and width control 66 in the example user interface 60 that is illustrated in FIG. 6.

Once the top, bottom, left, and right boundaries have been positioned, the boundary clipping process invoked by boundary clipping sub-module 166 determines whether the boundaries of the region to which background shading is to be applied should be clipped to a surrounding container object, if any. See reference numeral 2400 in FIG. 7. In some implementations, this determination may be based on user input received via clipping control 68 in the example user interface 60 that is illustrated in FIG. 6. In other implementations, this determination may be based on an evaluation of whether any container object is present. If the boundaries should be clipped, the boundary clipping process invoked by boundary clipping sub-module 166 applies a clipping path to the region defined by boundary positioning sub-module 164. The clipping path, which may be defined by the geometry of an arbitrarily-shaped container object, can be applied on a graphics port which is used to render the background shading. See reference numeral 2450 in FIG. 7. This allows background shading to be applied to a plurality of glyphs that are contained within non-rectangular objects, and in particular, that are contained within any arbitrarily-shaped container object.

Once the region of background shading has been appropriately modified to conform to a container object, if any, the background shading process invoked by text shading sub-module 168 applies background shading to the region defined by the boundary positioning process. See reference numeral 2500 in FIG. 7. This can be accomplished by drawing the background shading color, pattern, or other visual characteristic on the aforementioned graphics port. Applying background shading optionally includes updating metadata that characterizes the digital content which includes the applied background shading. The previously identified plurality of glyphs and the background shading can then be displayed using the user interface generated by user interface sub-module 162. See reference numeral 2600 in FIG. 7. This allows a user to simultaneously define and visualize background shading.

Methodology: Positioning Top and Bottom Boundaries

Figure 3C:
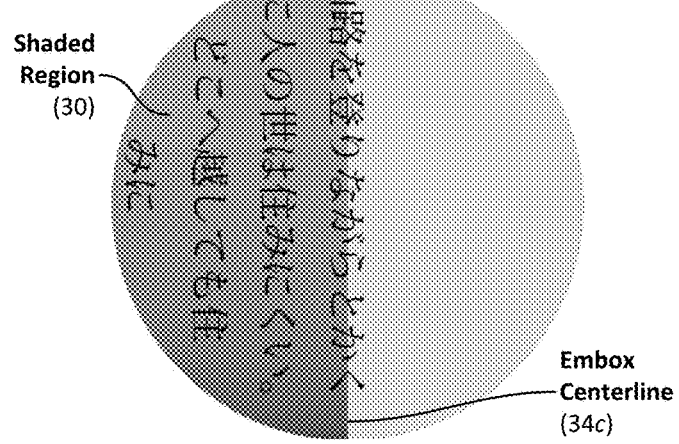
FIG. 3C illustrates Japanese characters associated with a shaded region defined by a top boundary that is aligned with an embox centerline of the first line of the Japanese characters.

FIGS. 8A and 8B comprise a flowchart illustrating an example method 2200 for positioning top and bottom boundaries of a region of background shading that is to be applied to digitally published text. The vertical span of the shaded region can be understood as the difference between the top and bottom edges of the shaded region. Method 2200 commences with obtaining a user selection that defines the position of the top boundary of the region to which background shading is to be applied. See reference numeral 2210 in FIG. 8A. In certain embodiments this user selection is provided via top edge position control 62 of example user interface 60. As illustrated in FIG. 6, a number of rules exist for defining the top boundary position. In some cases the top boundary position can be set manually, for example by the user specifying a position numerically or graphically. Examples of rules for defining the top boundary position include, but are not limited to:

a. Embox Top: Where background shading is to be applied to glyphs which are arranged in a frame grid, as is often the case for CJK typesetting, the top boundary of the shaded region may be positioned at the top edge of the first row of emboxes in the frame grid. See reference numeral 2211 in FIG. 8A. Background shading is thus applied to the entire area of each embox in the first row of the previously identified text. The top boundary of the shaded region is unaffected by the geometry of the particular glyphs present in the first row of emboxes. The result is a more stable and precise positioning of the top boundary of the shaded region. An example of such background shading is illustrated in FIG. 3B, where shaded region 30 uniformly extends to embox edges 34. Positioning the top boundary of the shaded region in this way can be achieved by selecting "Embox Top" in top edge position control 62 of user interface 60, as illustrated in FIG. 6.

b. Embox Center: Where background shading is to be applied to glyphs which are arranged in a frame grid, as is often the case for CJK typesetting, the top boundary of the shaded region may be positioned along a centerline of the first row of emboxes in the frame grid. See reference numeral 2212 in FIG. 8A. Background shading is thus applied to half of each embox in the first row of the previously identified text. The top boundary of the shaded region is unaffected by the geometry of the particular glyphs present in the first row of emboxes. The result is a more stable and precise positioning of the top boundary of the shaded region. An example of such background shading is illustrated in FIG. 3C, wherein shaded region 30 extends only to an embox centerline 34c associated with the first row of emboxes in the frame grid. Positioning the top boundary of the shaded region in this way can be achieved by selecting "Embox Center" in top edge position control 62 of user interface 60, as illustrated in FIG. 6. While one embodiment provides for positioning of the top boundary at embox centerline 34c, the top boundary may be positioned elsewhere with respect to a row of emboxes, including, for example, at a user-defined position with respect to the row of emboxes.

c. Baseline: The top boundary of the shaded region may be positioned along the baseline of the first line of identified text. See reference numeral 2214 in FIG. 8A. In this case, the top boundary of the shaded region is unaffected by the geometry of the particular glyphs present in the first line of identified text. The result is a more stable and precise positioning of the top boundary of the shaded region. An example of a baseline-based shading boundary 14b is illustrated in FIG. 1B, wherein boundary 14b extends uniformly across each column 10l, 10c, 10r. Positioning the top boundary of the shaded region in this way can be achieved by selecting "Baseline" in top edge position control 62 of user interface 60, as illustrated in FIG. 6.

d. Leading: The top boundary of the shaded region may be positioned one baseline increment above the identified text. See reference numeral 2215 in FIG. 8A. In this case, the top boundary of the shaded region is unaffected by the geometry of the particular glyphs present in the first line of identified text. The result is a more stable and precise positioning of the top boundary of the shaded region. An example of a leading-based shading boundary 14l is illustrated in FIG. 1B, wherein boundary 14l extends uniformly across each column 10l, 10c, 10r. Positioning the top boundary of the shaded region in this way can be achieved by selecting "Leading" in top edge position control 62 of user interface 60, as illustrated in FIG. 6.

e. Ascent: The top boundary of the shaded region may be positioned based on the largest ascent of all of the glyphs that comprise the fonts present in the identified text. More specifically, the top boundary can be positioned at a distance above the baseline of the first line of identified text, wherein the distance is substantially equal to the aforementioned largest ascent. As used herein, "substantially equal" refers to an equivalence that gives a consumer of the identified text the impression that the background shading would fully encompass all glyphs that comprise the fonts present in the identified text. Positioning the top boundary of the shaded region in this way can be accomplished by first identifying the fonts present in the identified text. See reference numeral 2216a in FIG. 8A. Each of the fonts present in the identified text defines a plurality of glyphs. The maximum ascent of the plurality of glyphs comprising the identified fonts is then determined. See reference numeral 2216b in FIG. 8A. Such a determination can be made with reference to font resources 122 stored in memory 120. The top boundary of the shaded region, also referred to as an ascent-based shading boundary, can then be positioned at the determined maximum ascent. See reference numeral 2216c in FIG. 8A. Thus, even if the identified text is later manipulated such that different glyphs are present in the first line, the top boundary of the shaded region will be unaffected by such manipulations. The result is a more stable and precise positioning of the top boundary of the shaded region. An example of ascent-based shading boundary 14a is illustrated in FIG. 1B, wherein boundary 14a extends uniformly across each column 10l, 10c, 10r. Positioning the top boundary of the shaded region in this way can be achieved by selecting "Ascent" in top edge position control 62 of user interface 60, as illustrated in FIG. 6.

Method 2200 also comprises obtaining a user selection that defines the position of the bottom boundary of the region to which background shading is to be applied. See reference numeral 2220 in FIG. 8B. While example method 2200 is described herein as defining the position of the top boundary before that of the bottom boundary, in alternative implementations the position of the bottom boundary is defined first. In certain embodiments the user selection that defines the position of the bottom boundary is provided via bottom edge position control 64 of example user interface 60. As illustrated in FIG. 6, a number of rules exist for defining the bottom boundary position. In some cases the bottom boundary position can be set manually, for example by the user specifying a position numerically or graphically. Examples of rules for defining the bottom boundary position include, but are not limited to:

a. Embox Bottom: Where background shading is to be applied to glyphs which are arranged in a frame grid, as is often the case for CJK typesetting, the bottom boundary of the shaded region may be positioned at the bottom edge of the last row of emboxes in the frame grid. See reference numeral 2221 in FIG. 8B. Background shading is thus applied to the entire area of each embox in the last row of identified text. The bottom boundary of the shaded region is unaffected by the geometry of the particular glyphs present in the last row of emboxes. The result is a more stable and precise positioning of the bottom boundary of the shaded region. An example of such background shading is illustrated in FIG. 3B, where shaded region 30 uniformly extends to embox edges 34. Positioning the bottom boundary of the shaded region in this way can be achieved by selecting "Embox Bottom" in bottom edge position control 64 of user interface 60, as illustrated in FIG. 6.

b. Embox Center: Where background shading is to be applied to glyphs which are arranged in a frame grid, as is often the case for CJK typesetting, the bottom boundary of the shaded region may be positioned along a centerline of the last row of emboxes in the frame grid. See reference numeral 2222 in FIG. 8B. Background shading is thus applied to half of each embox in the last row of the previously identified text. The bottom boundary of the shaded region is unaffected by the geometry of the particular glyphs present in the last row of emboxes. The result is a more stable and precise positioning of the bottom boundary of the shaded region. Positioning the bottom boundary of the shaded region in this way can be achieved by selecting "Embox Center" in bottom edge position control 64 of user interface 60, as illustrated in FIG. 6. While one embodiment provides for positioning of the bottom boundary at an embox centerline, the bottom boundary may be positioned elsewhere with respect to a row of emboxes, including, for example, at a user-defined position with respect to the row of emboxes.

c. Baseline: The bottom boundary of the shaded region may be positioned along the baseline of the last line of identified text. See reference numeral 2224 in FIG. 8B. In this case, the bottom boundary of the shaded region is unaffected by the geometry of the particular glyphs present in the last line of identified text. The result is a more stable and precise positioning of the bottom boundary of the shaded region. An example of a baseline-based shading boundary is illustrated in FIG. 1B, wherein boundary 14b extends uniformly across each column 10l, 10c, 10r. Positioning the bottom boundary of the shaded region in this way can be achieved by selecting "Baseline" in bottom edge position control 64 of user interface 60, as illustrated in FIG. 6.

d. Descent: The bottom boundary of the shaded region may be positioned based on the largest descent of all of the glyphs that comprise the fonts present in the identified text. More specifically, the bottom boundary can be positioned at a distance below the baseline of the last line of identified text, wherein the distance is substantially equal to the aforementioned largest descent. As used herein, "substantially equal" refers to an equivalence that gives a consumer of the identified text the impression that the background shading would fully encompass all glyphs that comprise the fonts present in the identified text. Positioning the bottom boundary of the shaded region in this way can be accomplished by first identifying the fonts present in the identified text. See reference numeral 2226a in FIG. 8B. Each of the fonts present in the identified text defines a plurality of glyphs. The maximum descent of the plurality of glyphs comprising the identified fonts is then determined. See reference numeral 2226b in FIG. 8B. Such a determination can be made with reference to font resources 122 stored in memory 120. The bottom boundary of the shaded region, also referred to as a descent-based shading boundary, can then be positioned at the determined maximum descent. See reference numeral 2226c in FIG. 8B. Thus, even if the identified text is later manipulated such that different glyphs are present in the last line, the bottom boundary of the shaded region will be unaffected by such manipulations. The result is a more stable and precise positioning of the bottom boundary of the shaded region. An example of a descent-based shading boundary 14d is illustrated in FIG. 1B, wherein boundary 14d extends uniformly across each column 10l, 10c, 10r. Positioning the bottom boundary of the shaded region in this way can be achieved by selecting "Descent" in bottom edge position control 64 of user interface 60, as illustrated in FIG. 6.

The example methods disclosed herein for positioning the top and bottom boundaries of a region of background shading can be applied in automated workflows. For example, baseline settings or fixed position settings can be scripted and applied as fixed offsets based on font attributes. Fixed position settings can be defined as a numerically-provided offset relative to a page edge, a margin, a column, a baseline, or some other layout feature. In embodiments wherein baseline settings or fixed position settings are scripted, user interface 60 and user interface sub-module 162 are optionally omitted.

Methodology: Positioning Left and Right Boundaries

FIG. 9 is a flowchart illustrating an example method 2300 for positioning left and right boundaries of a region of background shading that is to be applied to digitally published text. The horizontal span of the shaded region can be understood as the difference between the left and right edges of the shaded region. Method 2300 commences with obtaining a user selection that defines the width of the region to which background shading is to be applied. See reference numeral 2310 in FIG. 9. In certain embodiments the user selection is provided via width control 66 of example user interface 60. As illustrated in FIG. 6, a number of rules exist for defining the position of the left and right boundaries of the shaded region. In some cases the left and right boundary positions can be set manually, for example by the user specifying a position numerically or graphically. Examples of rules for defining the left and right boundary positions include, but are not limited to:

a. Column: Where the user specifies that the width of the shaded region should correspond to the width of the column containing the identified text, the left and right column boundaries for each line of identified text are determined. See reference numeral 2311 in FIG. 9. The left boundary of the shaded region is positioned at the leftmost column boundary. See reference numeral 2312 in FIG. 9. Likewise, the right boundary of the shaded region is positioned at the rightmost column boundary. See reference numeral 2314 in FIG. 9. An example of textual content having background shading that is applied in this way is illustrated in FIG. 2. In particular, FIG. 2 illustrates frame width background shading 24 that extends to frame boundary 22, regardless of the fact that the textual content within the frame does not. Positioning the left and right boundaries of the shaded region in this way can be achieved by selecting "Column" in width control 66 of user interface 60, as illustrated in FIG. 6.

b. Text: Where the user specifies that the width of the shaded region should correspond to the width of the identified text itself, the leftmost and rightmost points in each line of identified text are determined. See reference numeral 2315 in FIG. 9. The left boundary of the shaded region is positioned at the leftmost point for all lines of identified text. See reference numeral 2316 in FIG. 9. Likewise, the right boundary of the shaded region is positioned at the rightmost point for all lines of identified text. See reference numeral 2317 in FIG. 9. An example of textual content having background shading that is applied in this way is illustrated in FIG. 2. In particular, FIG. 2 illustrates text width background shading 26 that extends only to left and right text boundaries 20, regardless of the location of frame boundaries 22. This provides digital publishers with a greater degree of control over how background shading is applied to identified text, and in particular, helps avoid shading margin regions that do not contain any textual content. Positioning the left and right boundaries of the shaded region in this way can be achieved by selecting "Text" in width control 66 of user interface 60, as illustrated in FIG. 6.

The example methods disclosed herein for positioning the left and right boundaries of a region of background shading can be applied in automated workflows. For example, width control settings or fixed position settings can be scripted and applied as fixed offsets based on user preference. Fixed position settings can be defined as a numerically-provided offset relative to a page edge, a margin, a column, a baseline, or some other layout feature. In embodiments wherein width control settings or fixed position settings are scripted, user interface 60 and user interface sub-module 162 are optionally omitted.

Further Example Embodiments

Numerous variations and configurations will be apparent in light of this disclosure. For instance, as illustrated in FIG. 10, one example embodiment provides a computer-implemented method 3000 for applying background shading to textual content. The method includes receiving user input that defines a textual content segment that is to be located within a region of background shading. The textual content segment includes a first plurality of glyphs arranged in one or more lines. See reference numeral 3100 in FIG. 10. See also reference numeral 2100 in FIG. 7, which indicates that method 2000 for positioning the boundaries that define a region of background shading includes identifying a first plurality of glyphs to which background shading should be applied.

Method 3000 further includes identifying a font associated with the first plurality of glyphs. The identified font includes a second plurality of glyphs. See reference numeral 3200 in FIG. 10. See also reference numerals 2216*a* in FIG. 8A and 2226*a* in FIG. 8B, which indicate that method 2200 for positioning top and bottom boundaries of a region of background shading includes identifying fonts present in the identified text. Thus, in such embodiments the first plurality of glyphs includes the text selected to which background shading is to be applied, and the second plurality of glyphs includes the glyphs that collectively include one of the identified fonts.

Method 3000 further includes determining a maximum dimension associated with the second plurality of glyphs. See reference numeral 3300 in FIG. 10. See also reference numeral 2216*b* in FIG. 8A, which indicates that method 2200 for positioning top and bottom boundaries of a region of background shading includes determining a maximum ascent of the plurality of glyphs comprising the identified fonts, that is, the second plurality of glyphs. Likewise, reference numeral 2226*b* in FIG. 8B indicates that method 2200 includes determining a maximum descent of the second plurality of glyphs.

Method 3000 further includes positioning a boundary of the region of background shading at a distance from a baseline of a particular one of the lines. The distance is based on the determined maximum dimension. See reference numeral 3400 in FIG. 10. See also reference numeral 2216*c* in FIG. 8A, which indicates that method 2200 for positioning top and bottom boundaries of a region of background shading includes positioning a top boundary at a determined maximum ascent. Ascent-based shading boundary 14*a* illustrated in FIG. 1B is an example of a top boundary positioned in this way. See also reference numeral 2226*c* in FIG. 8B, which indicates that method 2200 includes positioning a bottom boundary at a determined maximum descent. Descent-based shading boundary 14*d* illustrated in FIG. 1B is an example of a bottom boundary positioned in this way.

Method 3000 further includes displaying background shading in the region of background shading. See reference numeral 3500 in FIG. 10. See also reference numerals 2500 and 2600 in FIG. 7, which indicate that method 2000 for positioning the boundaries that define a region of background shading includes applying background shading to a region defined by such boundaries, and displaying the plurality of glyphs with the background shading. Shaded regions 12*l*, 12*c*, 12*r* illustrated in FIG. 1B are examples of a region wherein a plurality of glyphs displayed with background shading, and wherein the region of background shading is at least partially defined by an ascent-based shading boundary.

In some cases (a) the textual content segment forms part of a digital publication; and (b) determining the maximum dimension associated with the second plurality of glyphs further includes accessing a font resource that does not form part of the digital publication. In some cases the method further includes (a) defining a clipping path that corresponds to a shape of a container object, wherein the textual content segment is positioned within the container object; and (b) applying the clipping path to a graphics port, wherein displaying the background shading includes drawing the background shading on the graphics port to which the clipping path has been applied. In some cases each glyph in the first plurality of glyphs is also included in the second plurality of glyphs. In some cases displaying the background shading further includes displaying the textual content segment over the background shading. In some cases (a) the determined maximum dimension is a maximum ascent associated with the second plurality of glyphs; (b) positioning the boundary further includes positioning a top boundary of the region of background shading at the distance above the baseline of a first line of the textual content segment; and (c) the distance is substantially equal to the maximum ascent. In some cases (a) the determined maximum dimension is a maximum descent associated with the second plurality of glyphs; (b) positioning the boundary further includes positioning a bottom boundary of the region of background shading at the distance below the baseline of a last line of the textual content segment; and (c) the distance is substantially equal to the maximum descent. In some cases (a) determining the maximum dimension further includes determining a maximum ascent and a maximum descent associated with the second plurality of glyphs; (b) positioning the boundary further includes (i) positioning a top boundary at a distance above a baseline of a first line of the textual content segment, and (ii) positioning a bottom boundary at a distance below a baseline of a last line of the textual content segment; (c) the distance above the baseline of the first line of the textual content segment is substantially equal to the maximum ascent; and (d) the distance below the baseline of the last line of the textual content segment is substantially equal to the maximum descent. In some cases (a) identifying the font associated with the first plurality of glyphs further includes identifying a plurality of fonts; and (b) determining the maximum dimension associated with the second plurality of glyphs further includes determining a maximum dimension associated with all glyphs that comprise the plurality of fonts. In some cases the user input that defines the textual content segment includes graphical highlighting that identifies the textual content segment.

Another example embodiment provides a background shading system. The system includes a memory device. The system further includes a processor that is operatively coupled to the memory device. The processor is configured to execute instructions stored in the memory device that, when executed, cause the processor to carry out a process for applying background shading to textual content. The process includes identifying text that is to be located within a region of background shading. The text includes a plurality of glyphs, each of which is positioned within an embox. The emboxes form a frame grid. The process further includes receiving user input that defines a boundary of the region of background shading. The boundary is defined with reference to a feature common to a group of the emboxes that are positioned along an edge of the frame grid. The feature is independent of the glyphs contained within the emboxes. The process further includes applying background shading to the region of background shading. In some cases (a) the feature is a top edge of the emboxes that are positioned along a top edge of the frame grid; and (b) the boundary is a top edge of the region of background shading. In some cases (a) the feature is a bottom edge of the emboxes that are positioned along a bottom edge of the frame grid; and (b) the boundary is a bottom edge of the region of background shading. In some cases (a) the feature is a centerline of the emboxes that are positioned along the edge of the frame grid; and (b) the boundary is selected from a group consisting of a top edge of the region of background shading and a bottom edge of the region of background shading.

Another example embodiment provides a computer program product encoded with instructions that, when executed by one or more processors, cause a process for applying background shading to textual content to be carried out. The process includes receiving first user input that identifies textual content. The process further includes receiving second user input that at least partially defines a boundary of a region of background shading. The second user input is distinct from the first user input. The process further includes displaying the identified textual content and background shading in the region of background shading. In some cases (a) the identified textual content includes a plurality of glyphs, each of which is positioned within an embox, the emboxes forming a frame grid; and (b) the second user input defines the boundary with respect to a feature common to a group of the emboxes that are positioned along an edge of the frame grid, wherein the feature is independent of the glyphs contained within the emboxes. In some cases (a) the identified textual content includes a plurality of glyphs, each of which is positioned within an embox, the plurality of emboxes forming a frame grid; and (b) the second user input defines the boundary with respect to a centerline of a group of emboxes that are positioned along an edge of the frame grid. In some cases the second user input defines top and bottom boundaries of the region of background shading in terms of a distance from first and last lines, respectively, of the identified textual content. In some cases (a) the second user input defines top and bottom boundaries of the region of background shading in terms of a distance from first and last lines, respectively, of the identified textual content; and (b) the distance depends on a maximum dimension of glyphs comprising a font that forms part of the identified textual content. In some cases the second user input defines left and right boundaries of the region of background shading in terms of a width of a column that is formed by the identified textual content.

The foregoing description has been presented for the purposes of illustration and description. It is not intended to be exhaustive or to limit the disclosure to the particular described embodiments. Therefore many modifications and variations are possible in light of this disclosure. Thus it is intended that the scope of the invention be limited not by this detailed description, but rather by the claims appended hereto.

What is claimed is:

1. A background shading system that comprises a memory device and a processor that is operatively coupled to the memory device, wherein the processor is configured to execute instructions stored in the memory device that, when executed, cause the processor to carry out a process for applying background shading to textual content, the process comprising:

identifying text that is to be located within a region of background shading, wherein the text comprises a plurality of glyphs, each of which is positioned within an embox, the emboxes forming a frame grid;

receiving user input that defines a boundary of the region of background shading, wherein the boundary is defined with reference to a feature common to a group of the emboxes that are positioned along an edge of the frame grid, wherein the feature is independent of the glyphs contained within the emboxes; and applying background shading to the region of background shading.

2. The background shading system of claim 1, wherein:
the feature is a top edge of the emboxes that are positioned along a top edge of the frame grid; and
the boundary is a top edge of the region of background shading.

3. The background shading system of claim 1, wherein:
the feature is a bottom edge of the emboxes that are positioned along a bottom edge of the frame grid; and
the boundary is a bottom edge of the region of background shading.

4. The background shading system of claim 1, wherein:
the feature is a centerline of the emboxes that are positioned along the edge of the frame grid; and
the boundary is selected from a group consisting of a top edge of the region of background shading and a bottom edge of the region of background shading.

5. A non-transitory computer readable medium encoded with instructions that, when executed by one or more processors, cause a process for applying background shading to textual content to be carried out, the process comprising:
receiving first user input that identifies texture content;
receiving second user input that at least partially defines a boundary of a region of background shading, wherein the second user input is distinct from the first user input; and
displaying the identified texture content and background shading in the region of background shading.

6. The computer readable medium of claim 5, wherein:
the identified textual content comprises a plurality of glyphs, each of which is positioned within an embox, the emboxes forming a frame grid; and
the second user input defines the boundary with respect to a feature common to a group of the emboxes that are positioned along an edge of the frame grid, wherein the feature is independent of the glyphs contained within the emboxes.

7. The computer readable medium of claim 5, wherein:
the identified textual content comprises a plurality of glyphs, each of which is positioned within an embox, the plurality of emboxes forming a frame grid; and
the second user input defines the boundary with respect to a centerline of a group of emboxes that are positioned along an edge of the frame grid.

8. The computer readable medium of claim 5, wherein the second user input defines top and bottom boundaries of the region of background shading in terms of a distance from first and last lines, respectively, of the identified textual content.

9. The computer readable medium of claim 5, wherein:
the second user input defines top and bottom boundaries of the region of background shading in terms of a distance from first and last lines, respectively, of the identified textual content; and
the distance depends on a maximum dimension of glyphs comprising a font that forms part of the identified textual content.

10. The computer readable medium of claim 5, wherein the second user input defines left and right boundaries of the region of background shading in terms of a width of a column that is formed by the identified textual content.

\* \* \* \* \*

UNITED STATES PATENT AND TRADEMARK OFFICE
CERTIFICATE OF CORRECTION

PATENT NO. : 9,792,702 B2
APPLICATION NO. : 14/942056
DATED : October 17, 2017
INVENTOR(S) : Vivek Ranjan et al.

Page 1 of 1

It is certified that error appears in the above-identified patent and that said Letters Patent is hereby corrected as shown below:

In the Claims

Column 21, Line 30, Claim 5, please replace "identifies texture content" with --identifies textual content--.

Column 21, Line 35, Claim 5, please replace "identified texture content" with --identifies textual content--.

Signed and Sealed this
Twentieth Day of November, 2018

Andrei Iancu
*Director of the United States Patent and Trademark Office*